United States Patent
Kersey

(10) Patent No.: US 11,193,827 B2
(45) Date of Patent: Dec. 7, 2021

(54) METHOD AND APPARATUS FOR IDENTIFYING BACKGROUND FLUORESCENCE USING SPREAD SPECTRUM EXCITATION-SOURCE BROADENING IN RAMAN SPECTROSCOPY

(71) Applicant: CytoVeris Inc., Farmington, CT (US)

(72) Inventor: Alan Kersey, South Glastonbury, CT (US)

(73) Assignee: CytoVeris, Inc., Farmington, CT (US)

(*) Notice: Subject to any disclaimer, the term of this patent is extended or adjusted under 35 U.S.C. 154(b) by 0 days.

(21) Appl. No.: 16/868,352

(22) Filed: May 6, 2020

(65) Prior Publication Data

US 2020/0355553 A1 Nov. 12, 2020

Related U.S. Application Data

(60) Provisional application No. 62/843,865, filed on May 6, 2019.

(51) Int. Cl.

| | |
|---|---|
| *G01J 3/44* | (2006.01) |
| *G01N 21/64* | (2006.01) |
| *G01N 21/65* | (2006.01) |

(52) U.S. Cl.
CPC ............ *G01J 3/44* (2013.01); *G01N 21/6486* (2013.01); *G01N 21/65* (2013.01); *G01J 2003/4424* (2013.01)

(58) Field of Classification Search
CPC ............... G01J 3/44; G01J 2003/4424; G01N 21/6486; G01N 21/65
See application file for complete search history.

(56) References Cited

U.S. PATENT DOCUMENTS

| | | |
|---|---|---|
| 7,092,852 B1 | 8/2006 | Kane |
| 7,177,022 B2 | 2/2007 | Wang |
| 7,245,369 B2 | 7/2007 | Wang |
| 7,864,311 B2 | 1/2011 | Klehr |
| 8,570,507 B1 | 10/2013 | Cooper |
| 9,905,990 B1 | 2/2018 | Pohl |

(Continued)

OTHER PUBLICATIONS

Dong Wei, Shou Chen, "Review of Fluorescence Suppression Techniques in Raman Spectroscopy", 2015.*

(Continued)

*Primary Examiner* — Maurice C Smith
(74) *Attorney, Agent, or Firm* — Getz Balich LLC

(57) ABSTRACT

A method and apparatus for determining a level of background fluorescent light produced during photometric interrogation of a sample is provided. The method includes applying an excitation light to a sample using a laser at a plurality linewidths different from one another, the excitation light at each of the plurality of different linewidths applied at an excitation wavelength operable to cause emission of light from the sample, the light emitted from the sample including Raman scattered light and background fluorescent light; detecting light emitted from the tissue sample at each of the plurality of linewidths using a detector and producing light signals representative of the detected light; and determining a level of the background fluorescent light using the light signals representative of the detected light for each of the plurality of different linewidths.

20 Claims, 5 Drawing Sheets

(56) References Cited

U.S. PATENT DOCUMENTS

| | | | |
|---|---|---|---|
| 2010/0238438 A1* | 9/2010 | Frankel | G02B 21/06 356/318 |
| 2012/0019818 A1* | 1/2012 | Wang | G01J 3/44 356/301 |

OTHER PUBLICATIONS

C. A. Lieber et al. "Automated method for subtraction of fluorescence from biological Raman spectra," Appl. Spectrosc. 57, 1363-1367 200.

Dahr et al. "A diffuse reflectance spectral imaging system for tumor margin assessment using custom annular photodiode arrays", Biomedical Optics Express, 3, (12), 2012.

Harmsen et al. "Cancer imaging using surface-enhanced resonance Raman scattering nanoparticles", Nat Protoc.; 11(4); 664-87, 2016.

Mahadevan-Jansen et al. "Raman spectroscopy for the detection of cancers and precancers", J Biomed Opt:; 1(1):31-70, 1996.

Matousek et al. "Noninvasive Raman spectroscopy of human tissue in vivo", Appl. Spectros. 60(7), 758-763, 2006.

Nguyen et al. "Fluorescence-guided surgery with live molecular navigation—a new cutting edge", Nat Rev Cancer, 13(9), pp. 653-662, 2013.

P.J. Cadusch et al., Improved Methods for Fluorescence Background Subtraction from Raman Spectra, J. Raman Spectrosc., 44, 1587-1595, 2013.

Pence I. et al., "Clinical instrumentation and applications of Raman spectroscopy", Chem Soc Rev.; 45 (7):1958-1979, 2016.

Talari, A. et al., "Raman Spectroscopy of Biological Tissues", Applied Spectroscopy Reviews, 50:1, 46-111, 2015.

Tummers et al. "Real-time intraoperative detection of breast cancer using near-infrared fluorescence imaging and methylene blue", Eur J Surg Oncol. 40(7), 850-858, 2014.

J. Zhao, M. M. Carrabba, and F. S. Allen, "Automated fluorescence rejection using shifted excitation Raman difference spectroscopy," Appl. Spectroscopy, 56, 834-845 2002.

* cited by examiner

METHOD AND APPARATUS FOR IDENTIFYING BACKGROUND FLUORESCENCE USING SPREAD SPECTRUM EXCITATION-SOURCE BROADENING IN RAMAN SPECTROSCOPY

This application claims priority to U.S. Patent Application No. 62/843,865 filed May 6, 2019, which application is incorporated by reference herein in its entirety.

BACKGROUND OF THE INVENTION

1. Technical Field

The present disclosure relates to methods and systems for analyzing tissue using Raman Spectroscopy in general, and the methods and systems for analyzing tissue using Raman Spectroscopy that account for and mitigate the effects of background fluorescence in particular.

2. Background Information

A range of advanced optical and electromagnetic (EM) imaging approaches have been reported for the determination of disease states in tissue, particularly for the detection and diagnosis of cancer. These approaches include the use of fluorescence imaging [1, 2], near infrared spectroscopy [3], Raman spectroscopy [4, 5], terahertz reflectivity [6], and the like.

Raman spectroscopy is a powerful analytical approach to the analysis of tissue [7], and has been shown to be effective in distinguishing between cancerous and normal tissue [8]. In the application of Raman spectroscopy to the study and analysis of tissue, however, the weak nature of the Raman spectral peaks creates a measurement challenge as the Raman signals are invariably riding on a level of background fluorescence due to the autofluorescent characteristics of the tissue or biological sample. In order to effectively analysis the Raman spectral signatures (sometimes referred to as the "Raman fingerprint" of the sample), the fluorescence background typically has to be removed or compensated for in order to perform detailed analysis on the Raman spectra. This analysis can include the forms of principal component analysis (PCA), multivariate analysis and other processing algorithms.

Several methods for the subtraction of background fluorescence have been reported and demonstrated using curve fitting algorithms [9], and a review of such approaches is reported in an article by Cadusch et al. [10]. Additionally, methods that involve using excitation signals at multiple wavelengths have also been demonstrated [11]. In its basic format, the use of a pair of excitation lasers comprising two slightly different excitation wavelengths allows the Raman signals to be shifted over the fluorescent background, and allows for a Raman spectra differencing technique to be used to assess the background. The approach may be referred to as Shifted Excitation Raman Difference Spectroscopy (SERDS). The basis of this technique lies in the fact that the Raman signature peaks occur at a fixed optical frequency offset from that of the excitation light, whereas the fluorescence signal does not change with the slight variation in excitation wavelength. The approach can also be accomplished using a single source which is varied in a step-wise manner over a wavelength range resulting in a corresponding variation in the Raman signature peaks.

What is needed is a method and system for analyzing tissue using Raman Spectroscopy that accounts for background fluorescence in an improved manner relative to methods and systems currently known.

SUMMARY

Figure 1:
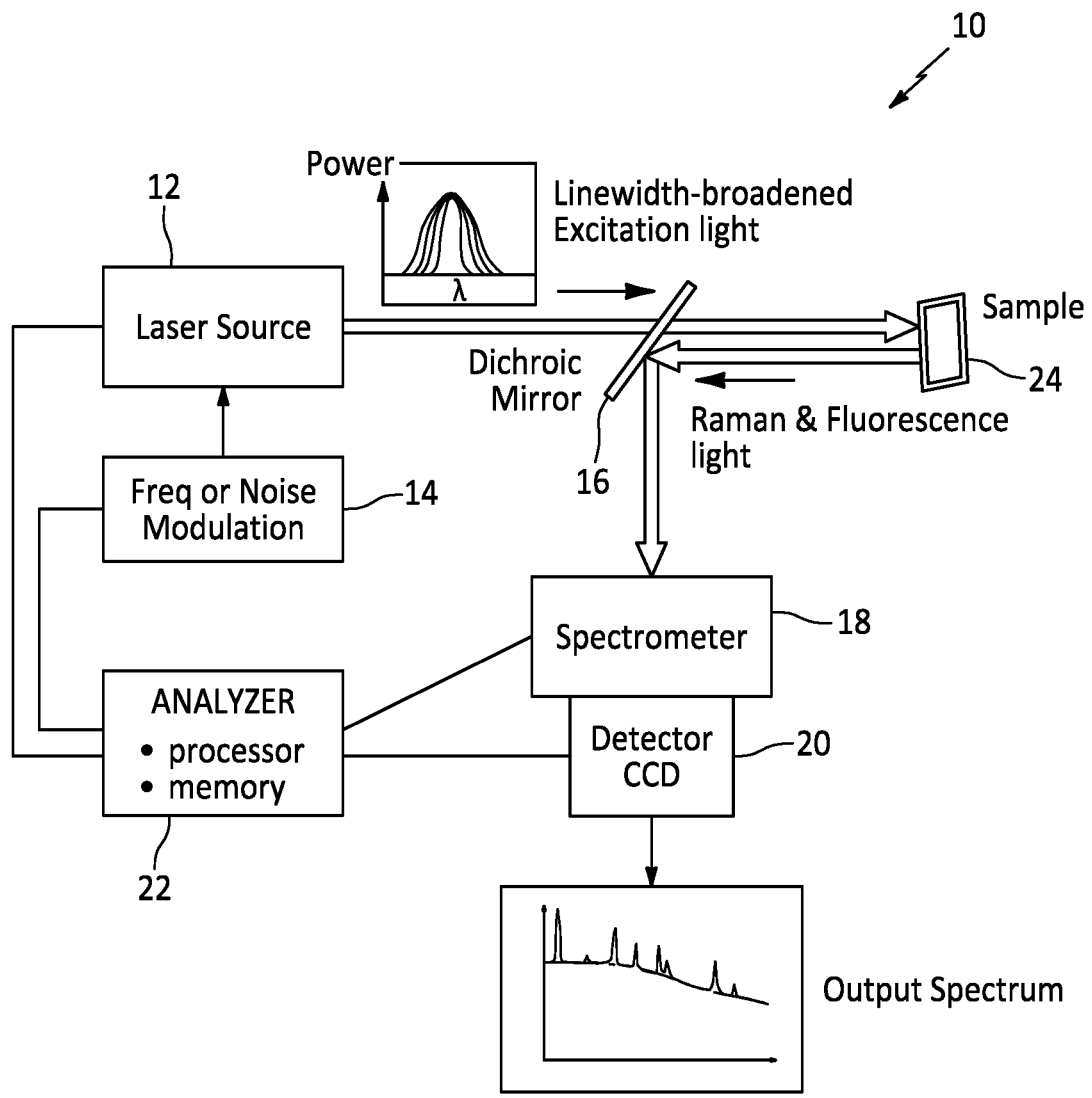
FIG. 1 is a diagrammatic illustration of an embodiment of a present disclosure system.

According to an aspect of the present disclosure, a method of determining a level of background fluorescent light produced during photometric interrogation of a sample is provided. The method includes: applying an excitation light to a sample using a laser at a first linewidth and separately at a second linewidth, the second linewidth broader than the first linewidth, the excitation light applied at a excitation wavelength operable to cause emission of light from the sample, the light emitted from the sample including Raman scattered light and background fluorescent light; detecting a first light emitted from the tissue sample using a spectrometer and a detector and producing first light signals representative of the detected first light, the first light emitted as a result of the excitation light being applied to the sample using the laser at the first linewidth; detecting a second light emitted from the tissue sample using the spectrometer and the detector and producing second light signals representative of the detected second light, the second light emitted as a result of the excitation light being applied to the sample using the laser at the second linewidth; and determining a level of the background fluorescent using the first light signals and the second light signals.

In any of the aspects or embodiments described above and herein, the second linewidth may be produced by modulating the laser.

In any of the aspects or embodiments described above and herein, the second linewidth may be produced using a modulating device independent of the laser.

In any of the aspects or embodiments described above and herein, the method may include applying the excitation light to the sample separately at a third linewidth, the third linewidth broader than the second linewidth; detecting a third light emitted from the tissue sample using the spectrometer and the detector and producing third light signals representative of the detected third light, the third light emitted as a result of the excitation light being applied to the sample using the laser at the third linewidth; and determining the level of the background fluorescent using the first light signals, the second light signals, and the third light signals.

In any of the aspects or embodiments described above and herein, the second linewidth and the third linewidth may be produced by modulating the laser.

In any of the aspects or embodiments described above and herein, the level of the background fluorescent may be determined by interpolating the first light signals, the second light signals, and the third light signals.

In any of the aspects or embodiments described above and herein, the sample may be a tissue sample.

According to another aspect of the present disclosure a method of analyzing a sample using Raman spectroscopy is provided. The method includes: applying an excitation light to a sample using a laser at a plurality linewidths different from one another, the plurality of different linewidths produced by modulating the laser, the excitation light at each of the plurality of different linewidths applied at an excitation wavelength operable to cause emission of light from the sample, the light emitted from the sample including Raman scattered light and background fluorescent light; detecting light emitted from the tissue sample at each of the plurality of linewidths using a spectrometer and a detector and producing light signals representative of the detected light; determining a level of the background fluorescent using the light signals representative of the detected light for each of the plurality of different linewidths; and analyzing the sample based on the Raman scattered light, including accounting for the determined level of background fluorescence.

According to another aspect of the present disclosure, an apparatus for determining a level of background fluorescence produced during Raman spectroscopic analysis of a sample is provided. The apparatus includes a laser, a spectrometer, a detector, and an analyzer. The analyzer has a processor. The analyzer is in communication with the laser, the detector, and a memory device storing executable instructions, which instructions when executed cause the processor to: control the laser to apply an excitation light to a sample at a plurality linewidths different from one another, the excitation light at each of the plurality of different linewidths applied at an excitation wavelength operable to cause emission of light from the sample, the light emitted from the sample including Raman scattered light and background fluorescent light; control the spectrometer and the detector to detect light emitted from the tissue sample at each of the plurality of linewidths and to produce light signals representative of the detected light; and determine a level of the background fluorescent using the light signals representative of the detected light for each of the plurality of different linewidths.

In any of the aspects or embodiments described above and herein, the apparatus may further include a modulator, and the instructions when executed cause the processor to control the modulator to modulate the laser to produce the plurality of linewidths.

In any of the aspects or embodiments described above and herein, the modulator may be configured to frequency modulate an input current to the laser.

In any of the aspects or embodiments described above and herein, the modulator may be configured to modulate the laser using a noise signal input to the laser.

In any of the aspects or embodiments described above and herein, the apparatus may further include an optical modulator external to the laser that is disposed to receive the excitation light from the laser and configured to modulate the excitation light to produce the plurality of linewidths.

In any of the aspects or embodiments described above and herein, the spectrometer may be disposed to receive the excitation light from the laser and the detector is disposed to receive the excitation light from the spectrometer.

In any of the aspects or embodiments described above and herein, the apparatus may further include a dichroic mirror or a beamsplitter disposed to receive the excitation light prior to the excitation light being applied to sample, and disposed to receive the light emitted from the sample.

In any of the aspects or embodiments described above and herein, the dichroic mirror or beamsplitter may be disposed to direct the light emitted from the sample to the spectrometer, and the detector is disposed to receive the excitation light from the spectrometer.

In any of the aspects or embodiments described above and herein, the excitation wavelength of the excitation light produced by the laser may be configured to produce the emission of light from a tissue sample.

In any of the aspects or embodiments described above and herein, the level of the background fluorescent may be determined by interpolating the light signals representative of the detected light for each of the plurality of different linewidths.

In any of the aspects or embodiments described above and herein, the instructions when executed may cause the processor to analyze the sample based on the Raman scattered light, including accounting for the determined level of background fluorescence.

The foregoing and other aspects and advantages of the present disclosure will appear from the following Detailed Description. In the Detailed Description, reference is made to the accompanying drawings which form a part hereof, and in which there is shown by way of illustration one or more preferred embodiments of the invention. Such embodiments do not necessarily represent the full scope of the disclosure, however, and reference is made therefore to the claims and herein for interpreting the scope of the disclosure.

DETAILED DESCRIPTION

Aspects of the present disclosure include a novel and unobvious mechanism and methodology for tissue analyses using Raman spectroscopy techniques, including a determination of the autofluorescence signal and/or accounting for autofluorescence in the analysis of tissue. Aspects of the present disclosure utilize a "spread spectrum" concept. In most spectral analysis systems, the spectral peaks observed are typically influenced by, or are a function of, several limiting factors. The most frequently cited limiting factor is the resolution of the spectral analysis system instrument. The term "linewidth" as used herein may be defined as the spectral width at half maximum ("FWHM") power. Alternative definitions for the term "linewidth" are known and may be used alternatively. The term "resolution" refers to the narrowest line-width that the spectral analysis system instrument can resolve (referred to herein as the "bandwidth" of the instrument), and typically arises due to the finite optical dispersive capabilities of the instrument. In a classic spectrometer arrangement, the limiting factors may, for example, include one or more of the factors determining the dispersive power of the spectrometer as defined by the input slit width, the grating or prism dispersion characteristics, the detector aperture, and the camera pixel or detector size used to sense the detected light.

The signal peaks within a Raman spectral response each have a linewidth that is related to the linewidth of the excitation light source used to create the Raman spectral response; e.g., narrow linewidth lasers produce narrow linewidth Raman spectral peaks (although closely spaced peaks may appear as a broadened profile at the spectrometer output). If the "natural" linewidth of a Raman peak analyzed by an instrument is much narrower than the instrument bandwidth, the Raman peak will appear broadened in view of the instrument bandwidth. The linewidth of any Raman peak is intrinsically "locked" to the stability of the excitation light source optical frequency, as the natural linewidth of a Raman peak cannot be better than the linewidth of the excitation light source. Consequently, characteristics of the Raman excitation light source such as jitter and instability may be reflected in the linewidth of any Raman signal peak generated by that excitation light source. Typically in high performance Raman spectroscopy systems, the excitation laser wavelength is stabilized to ensure the Raman signals are stable and reproduceable. However, if the laser is rapidly frequency modulated, for example by radiofrequency ("RF") laser current injection in the case of laser diode sources, the laser linewidth can be effectively broadened. This laser current modulation can, for example, take the form of a high frequency sinusoidal, or broadband "white" noise, or pseudo-random noise signal. If the modulation frequency of the laser is at a rate much higher than the detector integration time, the laser linewidth appears broadened by the system. This broadening of the excitation light linewidth is translated onto the Raman peaks, and thus the Raman linewidths increase. With such modulation, the "average" wavelength of the excitation light source can still be locked to a given value quite precisely through stabilization techniques well known in the art, but the excitation source linewidth can be broadened significantly beyond its natural value. Aspects of the present disclosure leverage this broadening to improve Raman signal analysis. As the excitation source linewidth is progressively broadened by increasing the RF modulation depth in a step-wise or continuously increasing manner, the linewidth of the Raman peaks undergo "spread spectrum" broadening and exceed the instrument bandwidth. At this point, the optical signal at the Raman peak appears to drop, as it is shared, or "spread out" over multiple resolvable instrument bandwidths.

According to some aspects of the present disclosure, the linewidth of the excitation light source is broadened and the resulting reduction in the peak height of Raman signal lines is detected. When the laser broadening exceeds the instrument resolution, the resulting broadening in the Raman spectral features allow precise interpolation of the background level at each Raman signal peak. As an example, the linewidth of the excitation light source may be increased in a step-wise manner (e.g., via increased laser modulation depth) to produce broadening of the excitation source linewidth to multiples of the instrument bandwidth (e.g., twice ("2×"), three times ("3×"), four times ("4×"), etc., of the instrument bandwidth), and the optical power value at the Raman signal peak for each broadening step can be measured. The present disclosure is not limited to any particular step-wise function. An algorithm can be used to interpolate (e.g., mathematically predict) the measured optical intensity values, for example up to a very large value associated with a hypothetical broadening (e.g., 1000× or some other predetermined broadening value). Under that hypothetical condition, the Raman signal peaks would undergo a spreading of their spectral characteristics and be "blurred", or "smeared" out over 1000 instrument bandwidths, and thus the Raman signal peaks would account for only 0.1% of the signals in the measured wavenumber window. The broadening of the excitation light source linewidth has no to minimal effect on the background autofluorescence signal, and thus the signal value is taken as representative of the background fluorescence signal at that point. The above described process may be done for each discrete Raman signal peak in the Raman spectra, and then a curve fitting technique (e.g., using a typical polynomial approach) may be utilized to assess the background fluorescence spectrum from these points. In another adaptation, the spectrum observed for each step-wise increase of the laser modulation could be fed to a Machine Learning algorithm to "learn" the position of the underlying fluorescence "baseline level" from the progressing drops in peak signal heights of the Raman peaks. The algorithm could be trained to assess this by substituting during a training process, the laser for a true broadband source of linewidth much larger than that of the Raman spectrometer, thus producing a fluorescence only measurement as a reference. A non-limited example of a system configured to practice the methods described herein is illustrated in FIG. 1. A more detailed description of the aforesaid system is provided below.

Figure 2:
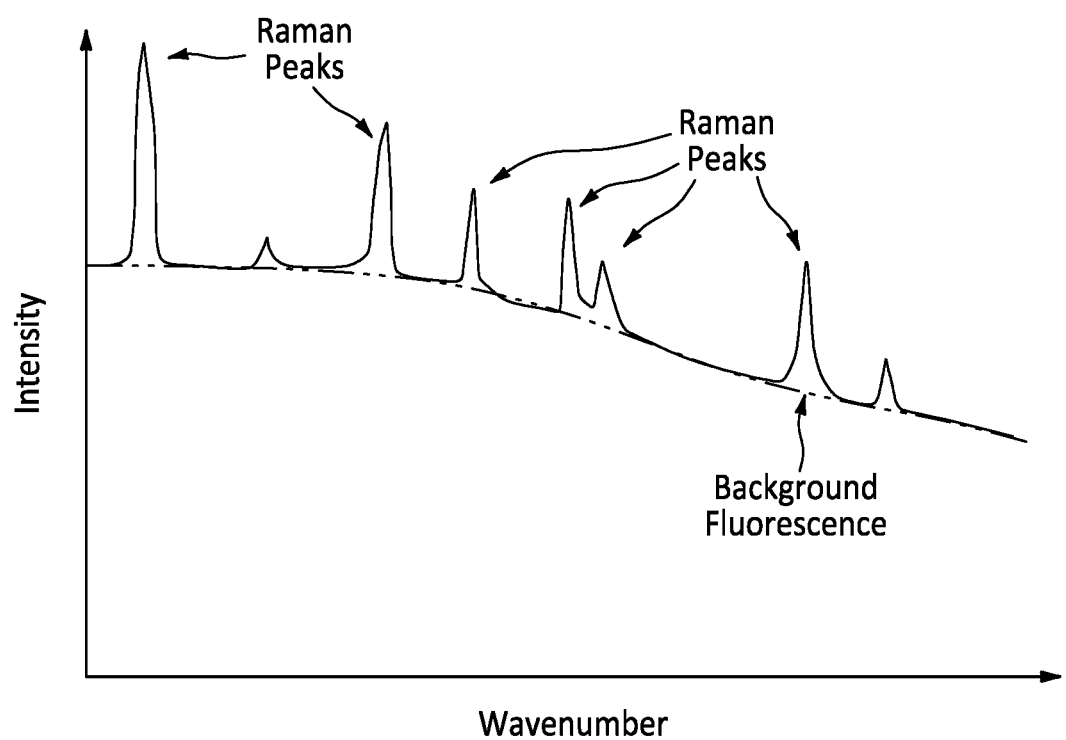
FIG. 2 is an intensity versus wavenumber graph diagrammatically illustrating Raman signal and fluorescence signal sensed by a detector portion of a present disclosure system.

As stated above, the laser excitation source may be coupled to a modulation source which broadens the laser linewidth via the use of RF modulation of the laser current, or via the injection of white noise or pseudo-random noise. The present disclosure is not limited to utilizing any particular modulation technique, however. For example, alternative modulation techniques that may be used include external modulators (e.g., optical modulators, etc.), or specialized laser resonator cavities incorporating wavelength modulation elements, etc. The excitation light is fed to a sample via free space or fiber coupling, and the returned composite fluorescence and Raman optical signals are fed to the spectrometer and detector system. As will be explained below in more detail, a dichroic mirror or other optical elements may be used to optimize the optical paths to the sample and to the spectrometer. A CCD array is a non-limiting example of an acceptable detector, but other detectors could be utilized alternatively. FIG. 2 shows an example of the typical detector output. As can be seen in FIG. 2, the Raman signal peaks may be described as "riding" on top of a strong fluorescence background. To facilitate further analysis of the Raman signals, the fluorescence background signals may be removed or otherwise accounted for.

Figure 3:
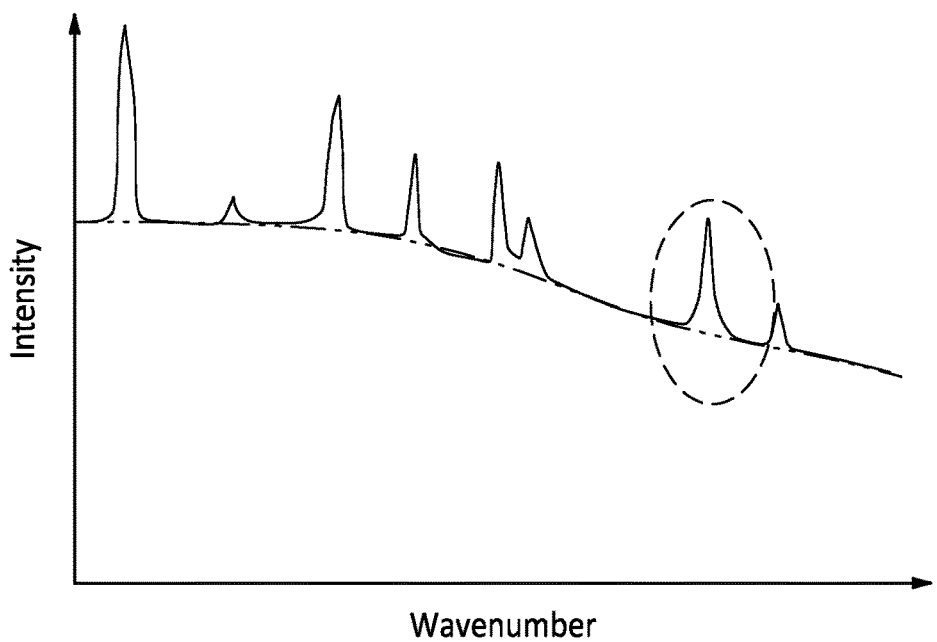
FIG. 3 is an intensity versus wavenumber graph diagrammatically illustrating Raman signal and fluorescence signal sensed by a detector portion of a present disclosure system, with an exemplary Raman signal peak highlighted.
Figure 3A:
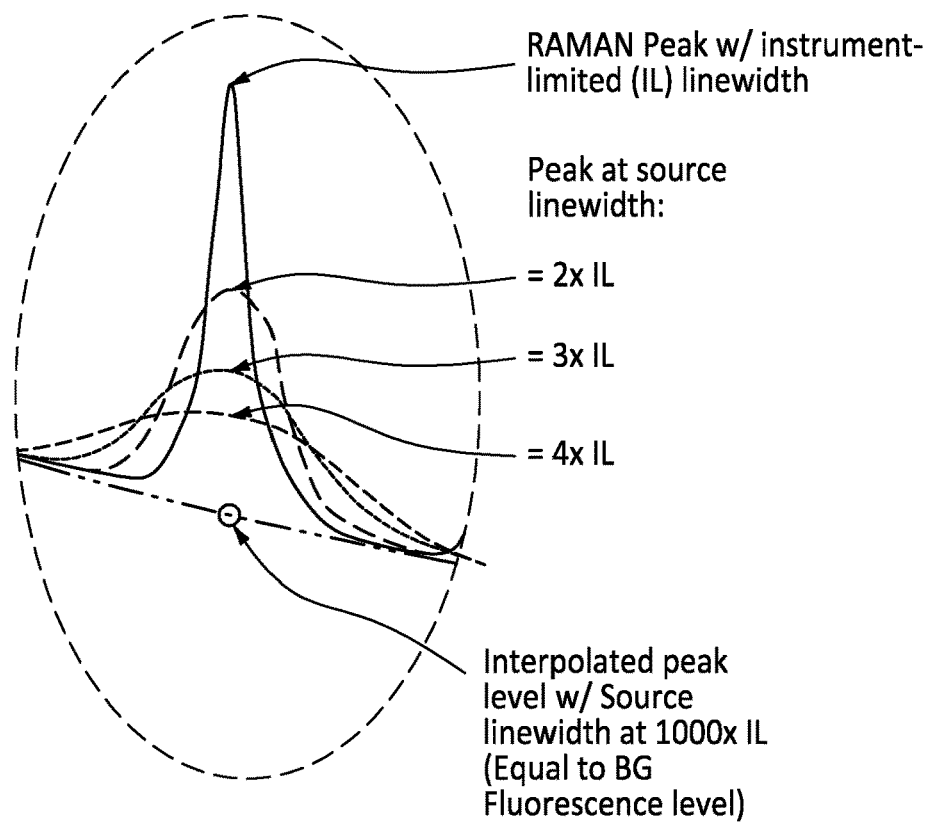
FIG. 3A is an enlarged version of the Raman signal peak highlighted in FIG. 3, illustrating an example of Raman signal peak height suppression for a plurality of source linewidth broadening steps.

FIGS. 3 and 3A diagrammatically illustrate aspects of the present disclosure. FIG. 3 provides an intensity vs. wavenumber graph of detected (Raman and fluorescence) signals received by the instrument and displayed. The peaks are representative of Raman signals and reflect a linewidth influenced (e.g., broadened) by the limited bandwidth of the instrument; i.e., the "natural" linewidth of the Raman signal peaks analyzed by the instrument are much narrower than the bandwidth of the instrument bandwidth. Hence, the Raman signal peaks shown in the graph—not purposefully broadened—may nonetheless appear slightly broadened as a result of the instrument bandwidth. A particular Raman signal peak is highlighted and enlarged in FIG. 3A. More specifically, FIG. 3A illustrates the chosen Raman signal peak in the form produced by the instrument without manipulation, and in forms broadened to twice ("2×"), three times ("3×"), and four times ("4×") the instrument limited bandwidth. FIG. 3A also shows an interpolated version of the Raman signal peak (broadened by a substantially large multiple; e.g., 1000×), where the Raman signal peak is substantially coincident with the level of fluorescence associated with the Raman signal peak. The broadened forms of the Raman signal peak (i.e., 2×, 3×, 4×, 1000×) are reduced in height and laterally spread out along the signal curve. By measuring the intensity reduction for the Raman signal peak for each broadened source linewidth, the underlying fluorescence level can be determined; e.g., by interpolation to much higher degrees of source linewidth broadening.

Figure 4A:
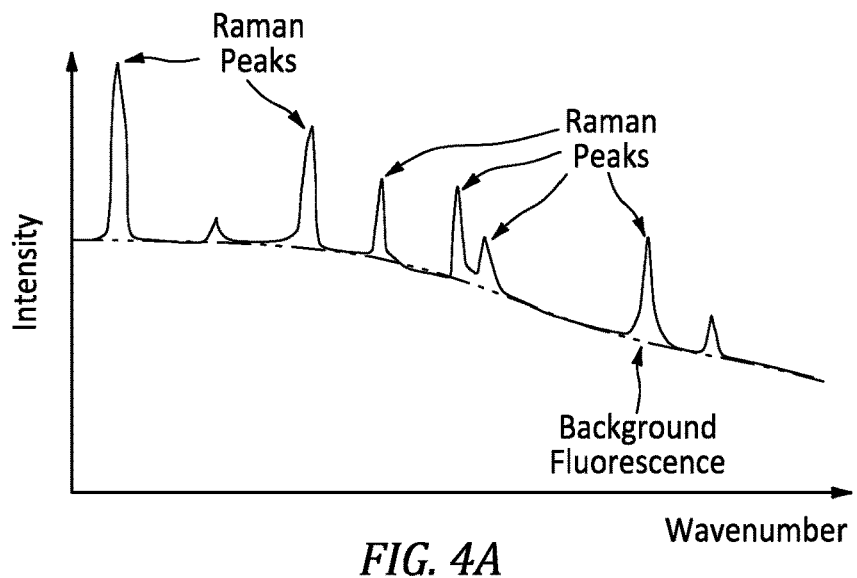
FIG. 4A is an intensity versus wavenumber graph diagrammatically illustrating Raman signal and fluorescence signal sensed by a detector portion of a present disclosure system utilizing an excitation laser operating in a normal (un-linewidth-broadened) mode.
Figure 4B:
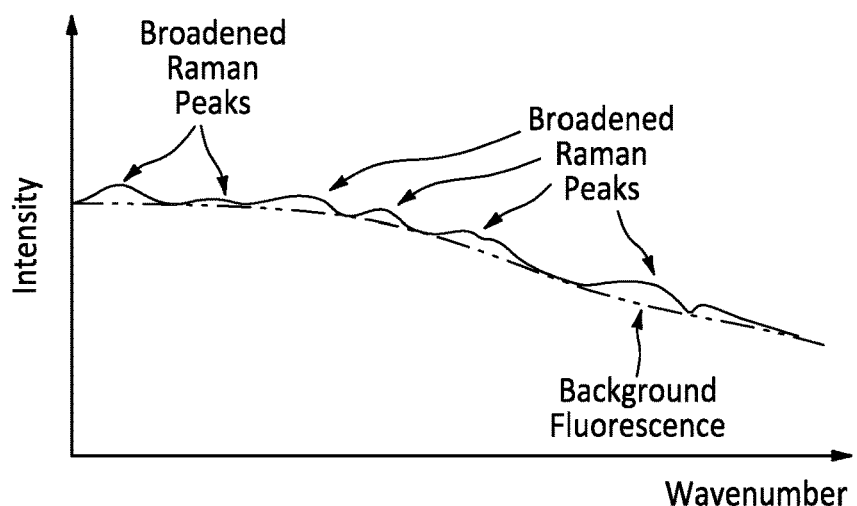
FIG. 4B is an intensity versus wavenumber graph diagrammatically illustrating Raman signal and fluorescence signal sensed by a detector portion of a present disclosure system utilizing an excitation laser operating in a spread-spectrum mode.
Figure 4C:
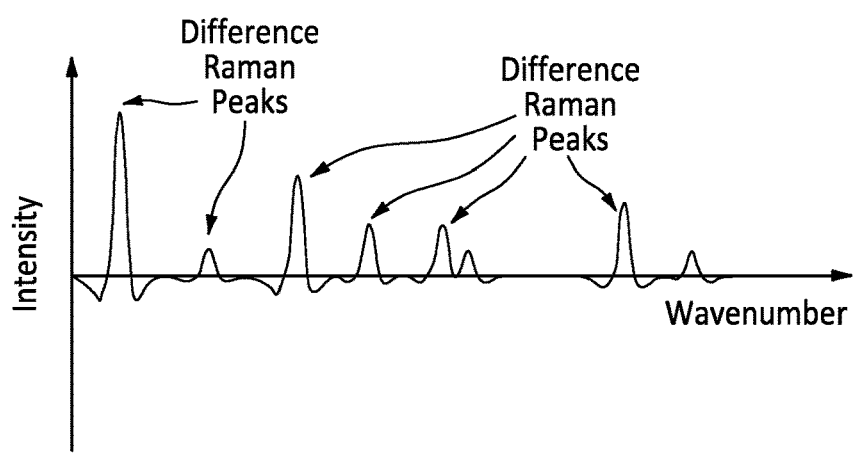
FIG. 4C is an intensity versus wavenumber graph diagrammatically illustrating Raman signal and fluorescence signal sensed by a detector portion of a present disclosure system utilizing an excitation laser operating in normal and spread-spectrum modes.
Figure 5:
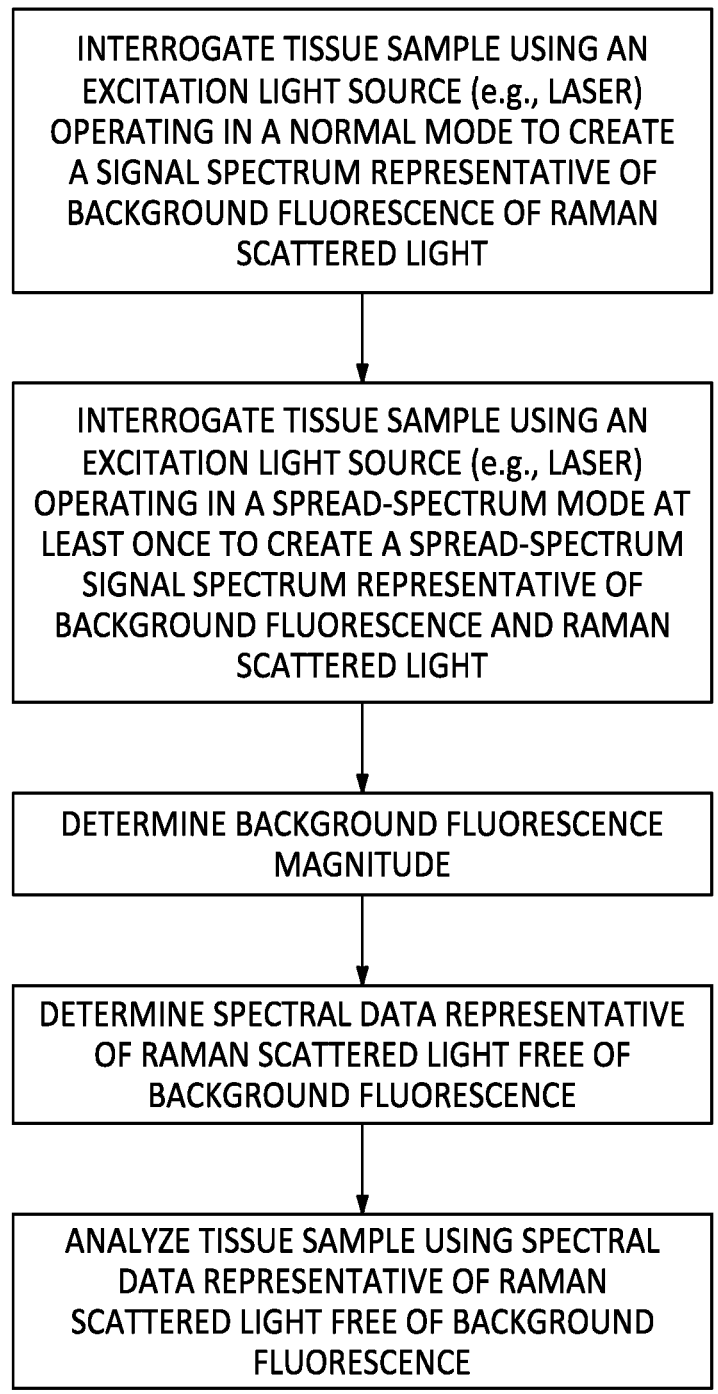
FIG. 5 is a flow chart illustrating an example of the present disclosure method.

In one or more alternative embodiments, with the excitation laser operating with its natural (narrow) linewidth, the Raman signal signature and associated fluorescence background may be measured and the spectrum recorded. (e.g., see FIG. 4A) A second spectrum may then be recorded with the laser excitation laser operating with its linewidth undergoing a spectral spreading to induce a spread linewidth (e.g., about 10× the spectrometer instrument bandwidth), and the resulting Raman and fluorescence background recorded (e.g., see FIG. 4B). The difference between these two spectra may then be calculated, resulting in a spectral signature free from the background fluorescence, as indicated in FIG. 4C. This spectrum may then be characterized by a zero background, with some slight "bipolar" peaks arising from the differencing of the normal and broadened Raman peak profiles. This alternative embodiment shown in FIGS. 4A-4C illustrates that the present disclosure is not limited to any particular number of broadening steps, other than at least one broadening step.

Referring back to FIG. 1, the non-limiting example of a system 10 configured to perform the present disclosure method is shown. The system 10 includes a light source 12 shown as a laser, a modulation unit 14 shown as a frequency or noise modulation unit, a dichroic mirror 16, a spectrometer 18, a light detector 20 shown as a charge couple device ("CCD"), and an analyzer 22. The present disclosure is not limited to this particular system 10 configuration. For example, the configuration of these components shown in FIG. 1 may vary in alternative system configurations operable to practice the present disclosure methodology. The system 10 embodiment shown in FIG. 1 and described herein may refer to various different system components as independent components. In alternative system 10 embodiments, system components may be combined, or arranged in a different manner than that shown in the Figures, and still be within the scope of the present disclosure.

The light source 12 (e.g., a laser) is configured to emit coherent light. A variety of different lasers may be used within the system, and the present disclosure is not therefore limited to using any particular laser. Examples of laser types include solid state, gas, diode laser or vertical-cavity surface-emitting lasers (VCSELs). The present disclosure may utilize coherent light at a variety of different wavelengths, and the light source is therefore not limited to coherent light at any particular wavelength.

The emitted light from the light source 12 may pass through the dichroic mirror 16 (or beam splitter) prior to interrogating the tissue sample 24. The tissue sample 24 may be in-vivo or ex-vivo. The interrogating light engaging with constituents in the tissue sample 24 causes the generation of Raman scattered light and light produced by autofluorescence, both of which emit from the tissue sample 24. The term "emit" or "emitted" as used herein relative to Raman scattered light and/or fluorescent light produced by autofluorescence, refers to light (i.e., Raman scattered light and/or fluorescent light) that exits the surface of the sample. At least a portion of the light emitted from the tissue sample 24 is incident to the dichroic mirror 16, which redirects the emitted light to a spectrometer 18. The spectrometer 18 is configured to receive and process the tissue emitted light to create a spectrum representative of the collected light as a function of intensity and wavelength. The light detector 20 receives the processed light from the spectrometer 18.

The light detector 20 receives the light processed by the spectrometer 18 and produces signals representative thereof. The signals produced by the light detector 20 are transferred to the analyzer 22. Non-limiting examples of light detectors 20 include light sensors that convert light energy into an electrical signal such as a simple photodiode, or other optical detectors of the type known in the art, such as CCD arrays. The present disclosure is not limited to any particular type of light detector 20.

Although not shown in the system diagrammatically shown in FIG. 1, embodiments of the present system may include optical components that facilitate the production and processing of the light produced within the system; e.g., filters, optical fibers, additional mirrors, etc.

The analyzer 22 is in communication with other components within the system, such as the light source 12, the light detector 20, and the like to control and/or receive signals therefrom to perform the functions described herein. The analyzer 22 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. The analyzer 22 may include a single memory device or a plurality of memory devices. The present disclosure is not limited to any particular type of non-transitory memory device, and may include read-only memory, random access memory, volatile memory, non-volatile memory, static memory, dynamic memory, flash memory, cache memory, and/or any device that stores digital information. The analyzer 22 may include, or may be in communication with, an input device that enables a user to enter data and/or instructions, and may include, or be in communication with, an output device configured, for example to display information (e.g., a visual display or a printer), or to transfer data, etc. Communications between the analyzer 22 and other system components (e.g., the light source 12, light detector 20, etc.) may be via a hardwire connection or via a wireless connection.

The instructions stored within the analyzer 22 are operable to perform the methodology described herein. For example, a tissue sample 24 (in-vivo or ex-vivo) may be analyzed under the present disclosure by interrogating the tissue sample 24 with one or more wavelengths of coherent light. The present disclosure is not limited to interrogating with any particular wavelengths of light, and the wavelengths are typically chosen to produce Raman light scattering from particular tissue analytes (e.g., cancerous tissue cells).

As shown in FIG. 1, the interrogating light produced by the light source 12 may pass through a dichroic mirror 16 (or beamsplitter) prior to reaching the tissue sample 24. Upon engagement of the interrogating light with the tissue sample 24, Raman scattering light and fluorescently emitted light are produced and emitted from the tissue sample 24. At least a portion of the light emitted from the tissue sample 24 will be incident to the dichroic mirror 16, and the mirror 16 in turn will direct the aforesaid light to the spectrometer 18. As indicated above, the spectrometer 18 may be configured to receive and process the light emitted from the tissue 24 to create a spectrum representative of the collected light as a function of intensity and wavelength. The light detector 20 receives the processed light spectrum from the spectrometer 18, produces signals representative thereof, and communicates those signals to the analyzer 22; e.g., via optical fibers, free-space, or some combination thereof, or the like.

The above tissue sample interrogation is repeated with the light source 12 operating in a spread-spectrum mode at least one more time to create a second signal spectrum; e.g., see description above regarding FIGS. 4A-4C. In some embodiments, the tissue sample interrogation may be repeated with the light source 12 operating in a spread-spectrum mode a plurality of times (e.g., 2×, 3×, 4×, etc.—see description above regarding FIGS. 3 and 3A). In any of these embodiments, the fluorescence background may be determined mathematically/algorithmically, including but not limited to a mathematical/algorithmic approach that interpolates the magnitude of the fluorescence background associated with the given wavelengths. The analyzer 22 may use the stored instructions to repeat this process for each discrete Raman signal peak. The background fluorescence level may be determined for a spread of wavelengths using a curve fitting technique or the like based on the data produced for each discrete Raman signal peak. As indicated with respect to the example shown in FIGS. 4A-4C, using aspects of the present disclosure a spectral signature substantially free from the background fluorescence may be produced, highlighting the Raman signature alone.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments. As another example, the present disclosure is discussed above in terms of interrogating a tissue sample. The present disclosure is not limited to use with tissue samples. Other materials that are sensed using Raman spectroscopy can produce a background level of fluorescence ("noise") that can negatively affect the sensing process. Hence, the present disclosure has utility for sample materials other than just tissue.

REFERENCES

1. Nguyen and Tsien, "Fluorescence-guided surgery with live molecular navigation—a new cutting edge", Nat Rev Cancer, 13(9), pp. 653-662, 2013.
2. Tummers, et al., "Real-time intraoperative detection of breast cancer using near-infrared fluorescence imaging and methylene blue", Eur J Surg Oncol., 40(7), 850-858, 2014.
3. Dahr et al., "A diffuse reflectance spectral imaging system for tumor margin assessment using custom annular photodiode arrays", Biomedical Optics Express, 3, (12), 2012.
4. Harmsen et al., "Cancer imaging using surface-enhanced resonance Raman scattering nanoparticles", Nat Protoc.; 11(4): 664-87, 2016
5. Matousek et al., "Noninvasive Raman spectroscopy of human tissue in vivo," Appl. Spectrosc. 60(7), 758-763, 2006.
6. Mahadevan-Jansen, Richards-Kortum, "Raman spectroscopy for the detection of cancers and precancers", J Biomed Opt.;1(1):31-70, 1996.
7. Talari, A. et al., "Raman Spectroscopy of Biological Tissues", Applied Spectroscopy Reviews, 50:1, 46-111, 2015.
8. Pence I., Mahadevan-Jansen A., "Clinical instrumentation and applications of Raman spectroscopy", Chem Soc Rev.; 45 (7):1958-1979, 2016
9. C. A. Lieber and A. Mahadevan-Jansen, "Automated method for subtraction of fluorescence from biological Raman spectra," Appl. Spectrosc. 57, 1363-1367 200.
10. P. J. Cadusch et al., Improved Methods for Fluorescence Background Subtraction from Raman Spectra, J. Raman Spectrosc., 44, 1587-1595, 2013
11. J. Zhao, M. M. Carrabba, and F. S. Allen, "Automated fluorescence rejection using shifted excitation Raman difference spectroscopy," Appl. Spectroscopy, 56, 834-845 2002.

The invention claimed is:

1. A method of determining a level of background fluorescent light produced during photometric interrogation of a sample, comprising:
    applying an excitation light to a sample using a laser at a first linewidth and separately at a second linewidth, the second linewidth broader than the first linewidth, the excitation light applied at a excitation wavelength operable to cause emission of light from the sample, the light emitted from the sample including Raman scattered light and background fluorescent light;
    detecting a first light emitted from the tissue sample using a spectrometer and a detector and producing first light signals representative of the detected first light, the first light emitted as a result of the excitation light being applied to the sample using the laser at the first linewidth;
    detecting a second light emitted from the tissue sample using the spectrometer and the detector and producing second light signals representative of the detected second light, the second light emitted as a result of the excitation light being applied to the sample using the laser at the second linewidth; and
    determining a level of the background fluorescent using the first light signals and the second light signals.

2. The method of claim 1, wherein the second linewidth is produced by modulating the laser.

3. The method of claim 1, wherein the second linewidth is produced using a modulating device independent of the laser.

4. The method of claim 1, further comprising applying the excitation light to the sample separately at a third linewidth, the third linewidth broader than the second linewidth;
    detecting a third light emitted from the tissue sample using the spectrometer and the detector and producing third light signals representative of the detected third light, the third light emitted as a result of the excitation light being applied to the sample using the laser at the third linewidth; and determining the level of the background fluorescent using the first light signals, the second light signals, and the third light signals.

5. The method of claim 4, wherein the second linewidth and the third linewidth are produced by modulating the laser.

6. The method of claim 5, wherein the level of the background fluorescent is determined by interpolating the first light signals, the second light signals, and the third light signals.

7. The method of claim 1, wherein the sample is a tissue sample.

8. A method of analyzing a sample using Raman spectroscopy, comprising:
- applying an excitation light to a sample using a laser at a plurality linewidths different from one another, the plurality of different linewidths produced by modulating the laser, the excitation light at each of the plurality of different linewidths applied at an excitation wavelength operable to cause emission of light from the sample, the light emitted from the sample including Raman scattered light and background fluorescent light;
- detecting light emitted from the tissue sample at each of the plurality of linewidths using a spectrometer and a detector and producing light signals representative of the detected light;
- determining a level of the background fluorescent using the light signals representative of the detected light for each of the plurality of different linewidths; and
- analyzing the sample based on the Raman scattered light, including accounting for the determined level of background fluorescence.

9. The method of claim 8, wherein the sample is a tissue sample.

10. An apparatus for determining a level of background fluorescence produced during Raman spectroscopic analysis of a sample, comprising:
- a laser;
- a spectrometer;
- a detector; and
- an analyzer having a processor, the analyzer in communication with the laser, the detector, and a memory device storing executable instructions, which instructions when executed cause the processor to:
  - control the laser to apply an excitation light to a sample at a plurality linewidths different from one another, the excitation light at each of the plurality of different linewidths applied at an excitation wavelength operable to cause emission of light from the sample, the light emitted from the sample including Raman scattered light and background fluorescent light;
  - control the spectrometer and the detector to detect light emitted from the tissue sample at each of the plurality of linewidths and to produce light signals representative of the detected light; and
  - determine a level of the background fluorescent using the light signals representative of the detected light for each of the plurality of different linewidths.

11. The apparatus of claim 10, further comprising a modulator;
wherein the instructions when executed cause the processor to control the modulator to modulate the laser to produce the plurality of linewidths.

12. The apparatus of claim 11, wherein the modulator is configured to frequency modulate an input current to the laser.

13. The apparatus of claim 11, wherein the modulator is configured to modulate the laser using a noise signal input to the laser.

14. The apparatus of claim 10, further comprising an optical modulator external to the laser that is disposed to receive the excitation light from the laser and configured to modulate the excitation light to produce the plurality of linewidths.

15. The apparatus of claim 10, wherein the spectrometer is disposed to receive the excitation light from the laser and the detector is disposed to receive the excitation light from the spectrometer.

16. The apparatus of claim 10, further comprising a dichroic mirror disposed to receive the excitation light prior to the excitation light being applied to sample, and disposed to receive the light emitted from the sample.

17. The apparatus of claim 16, wherein the dichroic mirror is disposed to direct the light emitted from the sample to the spectrometer, and the detector is disposed to receive the excitation light from the spectrometer.

18. The apparatus of claim 10, wherein the excitation wavelength of the excitation light produced by the laser is configured to produce the emission of light from a tissue sample.

19. The apparatus of claim 10, wherein the level of the background fluorescent is determined by interpolating the light signals representative of the detected light for each of the plurality of different linewidths.

20. The apparatus of claim 10, wherein the instructions when executed cause the processor to analyze the sample based on the Raman scattered light, including accounting for the determined level of background fluorescence.

* * * * *